United States Patent [19]

Merrill, Jr.

[11] B 4,013,544
[45] Mar. 22, 1977

[54] METHOD FOR MAKING AND SLURRYING WAX BEADS

[75] Inventor: LaVaun S. Merrill, Jr., Englewood, Colo.

[73] Assignee: Marathon Oil Company, Findlay, Ohio

[22] Filed: Aug. 21, 1974

[21] Appl. No.: 499,370

[44] Published under the second Trial Voluntary Protest Program on March 30, 1976 as document No. B 499,370.

Related U.S. Application Data

[63] Continuation-in-part of Ser. No. 289,918, Sept. 18, 1972, Pat. No. 3,846,279.

[52] U.S. Cl. .................................. 208/93; 137/13; 208/24; 208/37; 208/370; 302/66
[51] Int. Cl.² .......................................... F17D 1/16
[58] Field of Search ............... 208/24, 37, 93, 370; 137/13; 302/66; 264/9

[56] References Cited

UNITED STATES PATENTS

| | | | |
|---|---|---|---|
| 2,726,990 | 12/1955 | Baker .................................. | 208/33 |
| 3,234,122 | 2/1966 | Allibone et al. .................... | 208/370 |
| 3,294,672 | 12/1966 | Torobin ............................... | 208/33 |
| 3,425,429 | 2/1969 | Kane .................................... | 137/13 |
| 3,468,986 | 9/1969 | Watanabe ........................... | 264/9 |
| 3,846,279 | 11/1974 | Merrill ................................. | 208/93 |

Primary Examiner—Herbert Levine
Attorney, Agent, or Firm—Joseph C. Herring; Jack L. Hummel

[57] ABSTRACT

Hydrocarbon mixtures (e.g. "waxy" crude oils) are transported as a slurry by first fractionating the mixture into at least a relatively low pour point fraction and a relatively high pour point fraction. Thereafter, the high pour point fraction is congealed by dispersing it as particles into the bottom of a tower having a continuous stream of water flowing countercurrent to the dispersed fraction and wherein the water in at least the upper portion of the tower is at a temperature sufficient to congeal the dispersed particles. The particles pass upwardly through the tower and through an interface within the tower, the interface being the juncture of water and the low pour point fraction being introduced into the top portion of the tower. A portion of the resulting slurry is withdrawn and transported in a conduit at temperatures below those which bring about solution of the congealed particles in the low pour point fraction. Concentration of the congealed particles in the slurry is preferably about 10% to about 50% by weight. Also, the average diameter of the congealed particles is preferably about 0.1 to about 10 mm (millimeters).

31 Claims, 3 Drawing Figures

METHOD FOR MAKING AND SLURRYING WAX BEADS

CROSS REFERENCE TO RELATED APPLICATIONS

This application is a continuation-in-part of U.S. Ser. No. 289,918, filed Sept. 18, 1972 now U.S. Pat. No. 3,846,279.

BACKGROUND OF THE INVENTION

1. Field of the Invention

This invention relates to transporting viscous hydrocarbon mixtures, e.g. crude oil, by first fractionating the hydrocarbon mixture into at least two fractions, congealing one fraction and then combining the congealed fraction with a more fluid fraction and transporting same preferably in a conduit.

2. Description of the Prior Art

Pumping viscous hydrocarbon mixtures at temperatures below their pour point is very difficult. Heat transfer methods and chemical agents to improve fluid flow properties have been studied. Pour point depressers have been tried as well as diluents to improve the pumpability. Visbreaking agents have also been tried but with little success. In addition, the oil has been congealed, then suspended in water and the combination pumped at temperatures below the pour point of the crude oil.

Examples of patents representative of the art include:

Kells in U.S. Pat. No. 271,080 separates wax from crude oils by pumping the crude oil, e.g. in small streams or jets, into the bottom of a tank containing a brine at a temperature sufficiently low to congeal the wax. The congealed wax is recovered in the brine.

Persch in U.S. Pat. No. 1,154,485 blasts air under pressure into crude oil to form an emulsion of air and oil to increase the fluidity of the oil.

Oberfell et al. in U.S. Pat. No. 2,526,966 teaches transporting viscous crude oils by removing the light hydrocarbons (including straight run gasoline), hydrogenating the residue to increase the fluidity thereof and then combining the hydrogenated product and the light hydrocarbons and pumping the mixture.

Chilton et al. in U.S. Pat. No. 2,821,205 forms a film of water on the interior wall of the pipe to improve the pumpability of viscous oil. A light petroleum or condensed casing-head gas can be admixed with the crude oil to reduce the viscosity.

Scott et al. in U.S. Pat. No. 3,269,401 teach facilitating flow of wax-bearing oil in a pipeline by dissolving therein, at superatmospheric pressure and while above its pour point, a gas such as $N_2$, $CO_2$, flue gas, and hydrocarbons containing less than 3 carbon atoms. The "gas becomes associated in some way with the wax crystals and prevents the precipitated wax from agglomerating to form strong wax structures". Also, the gas collects on the surfaces of the wax particles, especially the larger ones, to form films of gas envelopes which isolate the particles from one another and prevent the wax particles from combining.

Kane in U.S. Pat. No. 3,425,429 transports viscous crude oils by forming an oil-in-water emulsion, the water containing a nonionic surfactant.

Watanabe in U.S. Pat. No. 3,468,986 forms spherical particles of wax by melting the wax, then dispersing same in a nonsolvent liquid (e.g. water) maintained at a temperature above the solidification temperature of the wax and thereafter cooling the dispersion to solidify the dispersed droplets into discrete solid particles. The particles can be coated with finely divided solids such as calcium carbonate, etc. Watanabe teaches that it is known in the art to disperse waxy particles by molding, prilling, spray drying, extruding, etc.

Titus in U.S. Pat. No. 3,527,692 transports crushed oil shale in a solvent slurry. The oil shale is first comminuted to a size of 140–325 mesh and then suspended in a solvent such as crude oil, retorted shale oil, or a fraction thereof.

Allen in U.S. Pat. No. 3,548,846 teaches transporting waxy crude oils by incorporating propane or butane within the crude oil.

Vairogs in U.S. Pat. No. 3,618,624 transports viscous crude oils by incorporating a miscible gas, e.g. $CO_2$, methane, ethane, into the crude to reduce the viscosity thereof.

The art has also used heat, e.g. tracer lines and large heat exchangers placed intermittently along the pipeline, to maintain the crude oil above its pour point and thus facilitate pumping of same. The main disadvantage of these methods is the crude oil tends to "set-up" during shut-downs.

This technology, except for heat transfer systems and crude oil-water suspension systems, has generally proven to be commercially unattractive.

SUMMARY OF THE INVENTION

Applicant's invention is the fractionation of a hydrocarbon mixture, e.g. high pour point crude oil(s), into at least two fractions, a relatively low pour point fraction and a relatively high pour point fraction. At least a portion, preferably at least 50% and more preferably substantially all of the relatively high pour point fraction, is then dispersed into the bottom of a tower wherein a continuous stream of water flows countercurrent to the introduced high pour point fraction. The high pour point fraction can be dispersed through nozzles, allowing interfacial tension to facilitate dispersion of the fraction. Or, sufficient turbulence can be induced into the high pour point fraction, with or without the admixture of water, before it comes in contact with water within the tower or as the fraction is introduced into the water within the tower to cause the fraction to disperse into discrete particles. Other dispersion means known in the art are useful as long as the fraction is dispersed as particles having an average diameter of about 0.05 to about 20 mm. The particles migrate upwardly in the tower and are congealed by water flowing countercurrent and at a sufficiently low temperature to congeal the particles. The congealed particles are permitted to pass through an interface, preferably in the top portion of the tower, the interface obtained from the water and a liquid hydrocarbon comprised of the relatively low pour point fraction. A portion of the slurry above the interface is withdrawn from the tower, and transported, preferably in a pipeline, at temperatures below those which cause solution of the congealed particles in the liquid hydrocarbon.

Viscous crude oil enters a fractionation tower wherein the crude is fractionated into a low pour point fraction and a high pour point fraction. The high pour point fraction passes through a heat exchanger (at this point identified as liquid wax) and thereafter enters the bottom of the tower where it comes in contact with water flowing countercurrent to the introduction of the liquid wax. The water exits from the tower as hot water, preferably down to 100°F. below the temperature of the liquid wax entering the bottom of the tower. An agitator imparts sufficient turbulence to water within the lower portion of the tower to facilitate dispersion of the liquid wax into discrete particles having an average diameter of about 0.1 to about 10 mm. As the dispersed liquid wax progresses upwardly in the tower, it is congealed by incoming cold water. The congealed particles rise to an interface of the water and the low point fraction (entering the top of the tower) and form a slurry in the low pour point fraction. A portion of the slurry above the interface is removed from the tower. Thereafter, the slurry is transported, preferably in a pipeline, at an average temperature below about the solution temperature of the congealed wax particles in the low pour point fraction.

Figure 1:
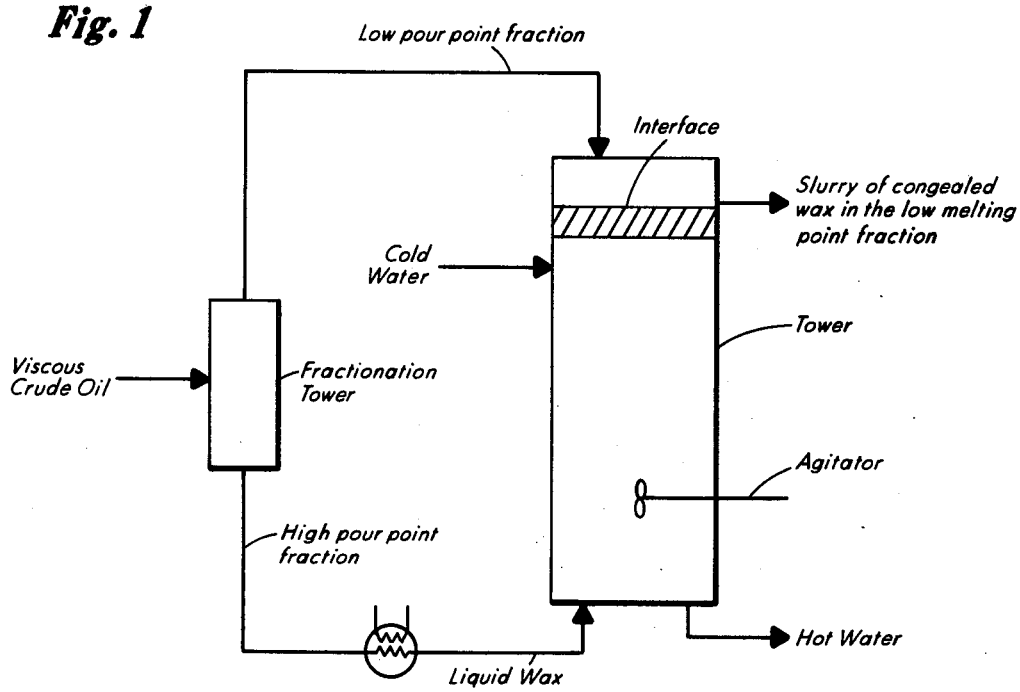
FIG. 1.
Figure 2:
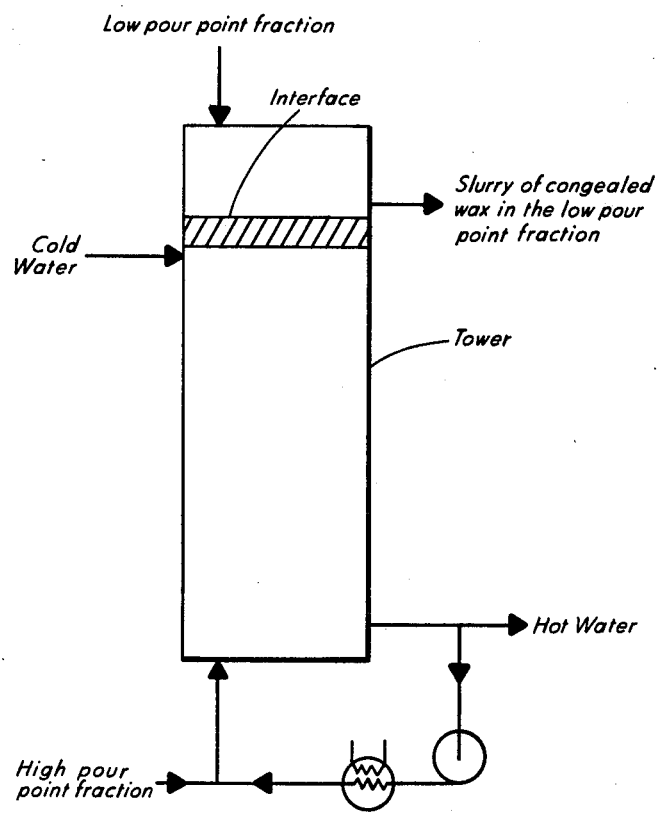

FIG. 2:

FIG. 2 illustrates a preferred embodiment of the invention. The high pour point fraction (in the liquid state) is mixed with hot water before the fraction enters the bottom of the tower. The hot water leaving the tower is pumped through a heat exchanger (optional) before it comes in contact with the higher pour point fraction, the two phase flow of the hot water and the fraction are under sufficient turbulent flow to facilitate dispersing the fraction into discrete particles within the hot water. Also, the surface tension forces between the high pour point fraction and the water facilitate dispersing the fraction. Cold water enters the top portion of the tower and hot water leaves the bottom of the tower. The dispersed fraction moves upward through the tower due to specific gravity differential and is congealed as it progresses up into cooler water within the tower. A low pour point fraction enters the top of the tower to maintain a hydrocarbon continuous phase and to form an interface in the top portion of the tower with the water. The congealed particles pass through the interface and form a slurry with the low pour point fraction. A portion of the slurry is withdrawn from the tower and transported in a conduit at a temperature below the solution temperature of the congealed particles.

Figure 3:
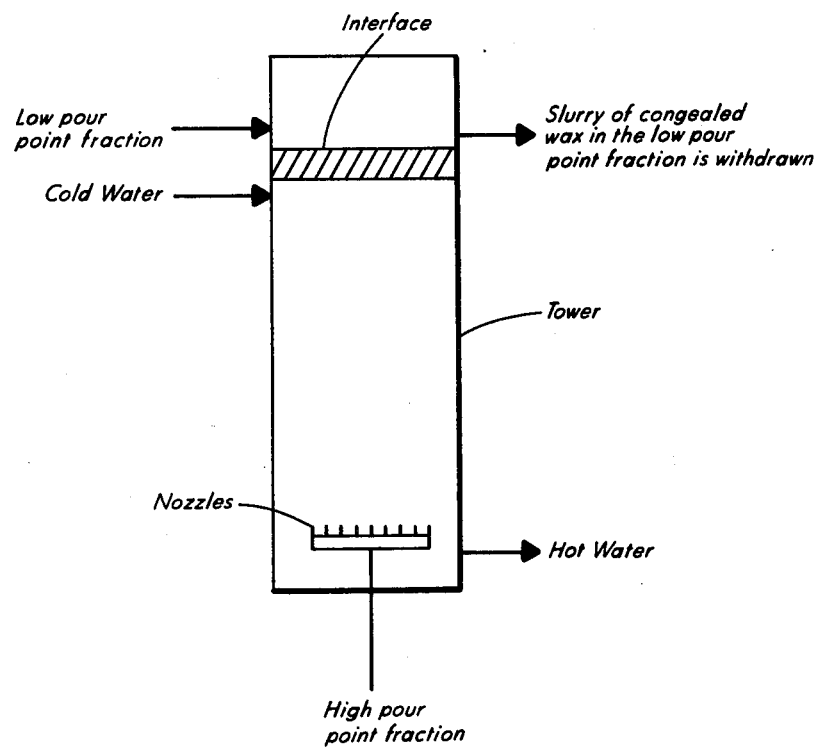

FIG. 3:

FIG. 3 illustrates an even more preferred embodiment of the invention. The high pour point fraction is introduced through nozzles at the bottom of the column. Cold water enters below the interface and flows countercurrent to the high pour point fraction and then exits as hot water at the bottom of the column. The introduced fraction is dispersed as discrete particles and are congealed by the water. The congealed particles pass through the interface of water and low pour point fraction and are removed as a slurry.

PREFERRED EMBODIMENTS OF THE INVENTION

Hydrocarbon mixtures having an average pour point below the seasonably ambient temperature of the transportation system, e.g. a pipeline, are particularly applicable with this invention. Examples of hydrocarbon mixtures include crude oil, shale oil, tar sand oil, fuel oil, gas oil, like hydrocarbon mixtures and mixtures of two or more of the same type or different hydrocarbon mixtures. Crude oils are particularly useful with this invention and especially those classified as "waxy" crude oils. Examples of the latter include crude oils which exhibit a "waxy gel" appearance at seasonably ambient temperature and which contain about 1% to about 80% wax (wax is defined as the precipitate which forms after one part of crude oil is dissolved in 10 parts of methyl ethyl ketone at about 80°C. and the mixture chilled to −25°C.) and preferably those which have an average pour point above the average minimum temperature of the transporting system, e.g. a pipeline. Examples of average pour points of crude oils particularly useful with this invention include about −10° to about 200° and preferably about 0° to about 150°F.

The hydrocarbon is first fractionated into at least two fractions, an overheads fraction which has a relatively low pour point and a bottoms fraction which has a relatively high pour point. The bottoms fraction or the relatively high pour point fraction can be any portion of the hydrocarbon mixture but is about 1% to about 80% and preferably about 20% to about 70% and more preferably about 30% to about 60% by weight of the original hydrocarbon mixture. It is to be understood that fractions in addition to the bottoms and overheads fractions can be obtained.

Fractionation can be accomplished at atmospheric pressure, sub or superatmospheric pressure and at low and high temperatures by processes such as distillation, solvent extraction, membrane fractionation, crystallization, or any process which separates the hydrocarbon mixture into at least two different fractions. Optionally, an equivalent amount of up to 50%, preferably up to 42% and more preferably up to 33% by volume of the high pour point fraction can be cracked (by thermal, hydrogenation, catalytical or combinations thereof) during fractionation or before congelation.

The low pour point fraction should have a pour point at least 1° and preferably at least about 5°F. and more preferably at least about 10°F. below the average temperature of the transporting system, such as a pipeline or a combination of pipeline and tank battery.

The high pour point fraction should be sufficiently dispersed in the water phase of the tower so that the resulting congealed particles have an average diameter in the water phase of the tower of about 0.05 to about 20 or more mm. and preferably about 0.1 to about 10 mm and more preferably about 0.5 to about 5 mm. The particles are preferably spherical and can be of substantially uniform or random diameter sizes.

*Dispersion:*

It is necessary that the high pour point fraction be in the liquid state and be finely dispersed, i.e. broken up into small particles, before congelation. Such can be effected by dispersing the fraction through nozzles, mixing the high pour point fraction with an immiscible liquid having a large interfacial tension with respect to the high pour point fraction, e.g. hot water, either before or after it is introduced into the tower, etc. If the fraction is dispersed into the bottom of the tower without having been admixed with water, it is preferred that the fraction immediately come in contact with hot water to facilitate dispersion. Turbulency can be imparted to the water by external and/or internal methods to facilitate dispersion.

The nozzle(s) can be rotating within the tower and can optionally have a perforated plate(s) mounted in the nozzle. Extrusion is also effective to disperse the fraction. In general, any method which can effectively disperse the fraction into the tower is effective with this invention.

The high pour point fraction is preferably about 5° to about 300°F., more preferably about 15° to about 200°F., and most preferably about 30° to about 180°F. above its average congelation temperature as it is dispersed into the tower.

*Congelation:*

Water entering the tower is preferably at about ambient temperature and is more preferably about 10° to about 120°F. below the average congelation temperature of the high pour point fraction. Congealing as used herein includes solidification, crystallization, making into a consistency like jelly, etc. Where hot water is combined with the high pour point fraction before coming into contact with water within the tower, the temperature of the combination is preferably at least about 5° and more preferably at least about 30°F. above the congelation temperature of the dispersed, high pour point fraction. However, where the high pour point fraction is not mixed with hot water before it enters the tower, the water exiting the tower is preferably about 10°F. to 100°F. above the average congelation temperature of the high point fraction—such facilitates dispersion of the fraction. Of course, there can be a large temperature differential from the cold water entering the tower to the water exiting the tower; but, the exiting water can be relatively close to ambient temperature when large flow rates of water are used. It is preferred that the temperature differential be large and more preferable that the gradient of the differential be small.

Where it is desired to obtain a more dense congealed fraction and/or a more "rigid" congealed fraction, i.e. a solid particle, the temperature differential of incoming to exiting water is preferably ambient or a lesser temperature (down to the freezing temperature of the water) to a temperature about equal the incoming, uncongealed high pour point fraction. Of course, desired densities and different degrees of rigidity can be obtained by varying the temperature differential of water entering and exiting the tower and the gradient of the differential.

Where the hot water is admixed with the high pour point fraction before the latter enters the tower, temperature of the mixture is preferably at least about 10°F. and more preferably at least about 30°F. above the congelation temperature of the dispersed fraction. Examples of useful temperature ranges for a crude oil having a pour point of about 100°–120°F. are about 110° to about 212°F. and preferably about 130° to about 160°F.

A surfactant can be incorporated into the high pour point fraction before the fraction is congealed, e.g. it can be admixed with the fraction before or as it enters the tower. Volume amounts of about 0.001 to about 20% and preferably about 0.01 to about 10%, and more preferably about 0.1 to about 1% by volume, based on the fraction, are useful. The surfactant should have sufficient oleophilic property to solubilize into or act like it is miscible with the fraction. It is postulated that the surfactant molecules tend to orient their hydrophilic portion radially at the particle surface. Theoretically, this happens as the congealed particles are formed, imparting a more hydrophilic property to the particle. Examples of useful surfactants include fatty acids (e.g. containing about 10 to about 20 carbon atoms) and preferably monovalent cation-containing salts thereof. Sorbitan monolaurate is an example of a useful surfactant. Preferably the surfactant is a petroleum sulfonate preferably having a monovalent cation, e.g. $Na^+$, and preferably having an average equivalent weight of about 200 to about 600 and more preferably about 250 to about 500 and most preferably about 350 to about 420.

Due to the density differential between the congealing or the congealed fraction and the tower water, the congealed fraction moves upwardly to the top portion of the tower. At the top portion of the tower, there is formed an interface between a liquid hydrocarbon being introduced into the top portion of the tower, preferably above the interface, and water within the tower. The liquid hydrocarbon is comprised of the low pour point fraction and any other hydrocarbon that is compatible with the slurry—preferably the liquid hydrocarbon is the low pour point fraction. Theoretically, all of the congealed particles pass through the interface and form a slurry with the liquid hydrocarbon—such an action displaces any water adhering to the surface of the congealed particles. The displaced water settles back into the water phase. The congealed particles tend to accumulate at the interface. There may be some particles still within the water phase due to the particles "stacking" up, i.e. the particles within the water phase tend to buoy up the particles immediately above them.

Preferably, the slurry of congealed fraction and the liquid hydrocarbon is removed from the interface at an elevation above the interface. Such is desired to keep water out of the slurry. However, minor amounts of water, e.g. about 0.1 to about 5% or more by volume may be carried over into the slurry without detrimental effect.

A liquid diluent, such as a straight-run gasoline, reservoir condensate or like hydrocarbon, can be admixed with the low pour point fraction (preferred liquid hydrocarbon) before, during or after the slurrying operation—any diluent which is soluble with the low pour point fraction and which preferably has a pour point below the minimum temperature of the transporting system is useful with this invention.

The liquid hydrocarbon entering the tower is preferably at least about 5° and more preferably at least about 30° and most preferably at least about 70°F. below the solution temperature of the congealed particles. Solution temperature as used herein is defined as that temperature at which substantially all of the congealed particles are placed into solution of the low pour point fraction.

Transportation of the slurry should be at temperatures which do not cause solution of a substantial amount of the particles. If a temperature increase is realized while transporting the slurry, e.g. through the conduit, such is not detrimental as long as the increase is positive. However, when the temperature starts cycling, e.g. about 30°F. above and below the solution temperature of the congealed particles, then adversities may be realized. Of course, temperature cycling at the end of the pipeline may occur without significantly affecting the pumpability of the slurry.

During or after congelation, the particles can be coated with gases, solid materials, or other desired agents to inhibit agglomeration, to permit high slurry temperatures during transportation, etc. Examples of solid materials include those disclosed in U.S. Pat. No. 3,468,986 to Watanabe. Examples of useful solid materials include inorganic and organic salts of the metals of Group II, III, IV-A, V, VI, VII, and VIII of the Periodic Table; synthetic resins such as cellulose acetate, polystyrene, polyethylene, polyvinyl acetate, and like resins; and other materials such as clay (e.g. betonite), kaolin, Fuller's earth and other aluminum silicates, limestone, etc. Calcium carbonate is a preferred coating material. Examples of useful gases include air, $CO_2$, lower hydrocarbons containing up to 4 carbon atoms, natural gas and like compounds.

The pH of the water as well as other conditions of the water and environment can be designed to facilitate sorbing the solid material or gas onto the congealed particles. The coating can be applied by contacting the congealed particles with a hydrous or anhydrous spray or bath or a combination thereof. When a water bath is used, the gas or solid material can be present in concentrations of about 10 to about 200,000 ppm and preferably about 100 to about 100,000 ppm. Of course, the solubility of the gas or solid material in the water bath will govern the concentration. It is desired that up to a monomolecular layer of the gas or solid material be deposited onto the congealed particles.

The concentration of congealed particles in the slurry is preferably about 1% to about 80% and more preferably about 5% to about 55% and most preferably about 10% to about 50% by weight. During the slurrying operation, the temperature of the low pour point fraction is preferably about 30° below to about 30°F. above and more preferably about 15° below to about 15°F. above the minimum, seasonably ambient temperature of the transportation system. Also, it is preferred that the temperature of the low pour point fraction during slurrying be about 30°F. and more preferably about 70°F. below the solution temperature of the congealed particles.

*Transportion of the slurry:*

The slurry can be transported in bulk, e.g. tank car, tank truck, tank trailer, tank barge, tanker or like means, but is preferably transported in a conduit, such as a pipeline. Of course, the conduit or pipeline system will have tank batteries, i.e. collection or holding tanks, associated with it.

The slurry can be transported under laminar flow, transitional flow (e.g. at Reynolds number of about 2,000 to about 4,000), turbulent flow, or a combination thereof.

The slurry is preferably transported in a condiut wherein the average maximum temperature of the conduit in at least its major, initial length is below the average solution temperature of the congealed particles in the low pour point fraction. The average maximum temperature of the conduit is preferably at least about 1°F. below and more preferably at least about 5°F. below the average solution temperature of the congealed particles within the slurry. In addition, the average temperature of the conduit should not be below the average pour point of the low pour point fraction and preferably is at least about 1°F. and more preferably at least about 5°F. above this pour point.

A gas miscible with the low pour point fraction can be admixed with the slurry to facilitate pumpability. The gas is preferably immiscible with the congealed particles. Examples of such gases include $CO_2$, hydrocarbon containing less than about 3 carbon atoms, $N_2$, flue gas, and like gases. The gas can be injected into the slurry under conditions such that the gas is present in concentrations greater than saturation conditions at atmospheric conditions.

Chemical agents, e.g. high molecular weight polymers, can be admixed with the slurry to facilitate suspension of the congealed particles. Also, viscosity reducing agents, pour point reducers, drag reduction agents, etc. can be admixed with the slurry to impart desired properties.

WORKING EXAMPLES

Example I

A glass column 2 inches inside diameter and 48 inches long is fitted with the necessary equipment to accomplish introduction of the following fluids. A crude oil having a pour point of 117°F. is distilled such that 42% is taken as overheads fraction (low pour point fraction) and 58% is taken as bottoms fraction (high pour point fraction). 2,000 cc/hr of the bottoms fraction at 160°F. is combined with 16,000 cc/hr of water recycled from the column and heated to 160°F. and the combination fed into the bottom of the column through a tubing (inside diameter = 1/16 inch). Water at 70°F. enters the column at about 8 inches from the top of the column and 13,000 cc/hr of water at 130°F. leaves the bottom of the column. The bottoms fraction is dispersed into the bottom of the column and congealed particles having an average diameter of about 0.5–2 mm are obtained. Flow rate of water within the column is such that laminar flow is obtained. The overheads fraction at 70°F. and at a rate of 1,450 cc/hr is introduced into the top of the column, an interface is formed between the overheads fraction and the water within the column. A slurry containing about 58% of the congealed spherical particles is withdrawn from the column at a point above the interface and is thereafter transported in about 28 feet of pipe having an inside diameter of about ½ inch.

Example II

A crude oil having a pour point of about 135°F. is distilled at atmospheric pressures into an overheads fraction (42% by volume) and a bottoms fraction (58% by volume). The bottoms fraction is heated to 180°F. and 3,200 cc/hr, is mixed with 6,300 cc/hr of water recycled from the bottom of the water column and heated to an average temperature of 190°F—the combination is under turbulent flow. The aqueous bottoms fraction is introduced through a tube having an inside diameter of 0.083 inch into the bottom of a column identical with that described in Example I. Water at 70°F. enters the column at about 10 inches from the top of the column, and 13,000 cc/hr of water at 130°F. leaves the bottom of the column. The water within the column has a velocity of about 0.2 cm/sec. The average congelation temperature of the bottoms fraction being introduced into the column is about 120°F. The overheads fraction, at 70°F. and at a rate of 2300 cc/hr, is introduced into the top of the column along with about 900 cc/hr of straight-run gasoline (at 70°F.). An interface is formed about 8 inches from the top of the column between the overheads fraction/gasoline and the water within the column. About 6400 cc/hr of slurry composed of about 50% of congealed high pour point fraction having an average diameter of about 0.5–2 mm is withdrawn at about 2 inches above the interface within the column.

The slurry is transported through 28 feet of ½inch pipe in a closed loop through a centrifugal pump. The average temperature of the slurry within the pipe is about 70°F. After 150 complete cycles through the loop, the slurry is examined and it is observed that the particles are still intact and not even a minor portion are in solution.

Example III

A 4 inch diameter glass column 8 feet long is fitted with five nozzles in the bottom. Liquid wax (high pour point fraction) at a temperature of 180°F. and a flow rate of 40 lbs/hr is fed to the five nozzles. Water at 50°F. is injected 12 inches from the top of the column. A low pour point fraction, obtained from the same crude oil as the wax, at 70°F. is injected into the top of the column at the rate of 80 lbs/hr. An interface is maintained between the cold water injection point and the low pour point fraction injection point. Water is removed from the bottom of the column at 120°F. The liquid wax fed to the nozzles froms particles which congeal as they rise up through the cooler water. A bed of particles forms at the interface with the lower particles lifting the upper particles through the interface into the flowing hydrocarbon phase. A slurry is drawn off above the interface having a total water content of 0.6%. The slurry is pumped through a pipeline at reasonable pressure drop.

It is not intended that the above examples limit the invention in any way. Rather, all equivalents obvious to those skilled in the art are intended to be equated within the spirit of the invention as exemplified by the specification and appended claims.

What is claimed is:

1. A process for transporting a hydrocarbon mixture as a slurry, the process comprising:
   1. fractionating the hydrocarbon mixture into at least a relatively low pour point fraction and a relatively high pour point fraction,
   2. introducing at least a portion of the relatively high pour point fraction into the bottom of a tower having a continuous stream of water flowing countercurrent to the introduction of the relatively higher pour point fraction and wherein the water enters the top portion of the tower at a temperature at least about 5°F. below the congelation temperature of the relatively high pour point fraction,
   3. dispersing into the water within the tower the high pour point fraction as particles having an average diameter within the range of about 0.05 to about 20 mm, said dispersion being under nonturbulent flow conditions, and permitting the dispersed particles to stay in contact with the water for sufficient time to substantially congeal the particles,
   4. passing the resulting congealed particles through an interface, the interface being the juncture between a liquid hydrocarbon comprised of the low pour point fraction introduced into the top of the tower, and the water within the tower,
   5. withdrawing at least a portion of the resulting slurry of the congealed particles in the liquid hydrocarbon at about the interface and thereafter transporting the slurry at temperature below those which bring about substantial solution of the congealed particles in the liquid hydrocarbon.
2. The process of claim 1 wherein the hydrocarbon mixture is a "waxy" crude oil.
3. The process of claim 1 wherein the hydrocarbon mixture is a crude oil having an average wax concentration of about 1 to about 80 % by weight.
4. The process of claim 1 wherein the "waxy" crude oil has an average pour point above about the average seasonably minimum temperature of the transportation system.
5. The process of claim 1 wherein the hydrocarbon mixture is a crude oil having an average pour point of about −10° to about 200°F.
6. The process of claim 1 wherein the transportation system is a conduit.
7. The process of claim 1 wherein the relatively high pour point fraction is equivalent to about 20 to about 70% of the weight of the hydrocarbon mixture.
8. The process of claim 1 wherein slurrying is effected at a temperature at least about 5°F. below the solution temperature of the congealed particles in the low pour point fraction.
9. The process of claim 1 wherein the particles are congealed at a temperature at least about 5°F. below the pour point of the high pour point fraction.
10. The process of claim 1 wherein an equivalent amount of up to about 50% by weight of the high pour point fraction is cracked before it is dispersed into the tower.
11. The process of claim 1 wherein the average diameter of the congealed particles is about 0.1 to about 10 mm.
12. The process of claim 1 wherein a liquid diluent soluble in the liquid hydrocarbon is admixed with the low pour point fraction before, during or after the slurrying.
13. The process of claim 1 wherein the relatively high pour point fraction is introduced into the bottom of the tower under turbulent flow.
14. The process of claim 1 wherein the average diameter of the congealed particles is about 0.5 to about 5 mm.
15. A process of transporting a "waxy" crude oil in a conduit as a slurry, the process comprising:
   1. fractionating the crude oil into at least a relatively low pour point fraction and a relatively high pour point fraction,
   2. dispersing the high pour point fraction at a temperature of about 15° to about 200°F. above its average congelation temperature into water within the bottom of a tower as particles having an average diameter of about 0.05 to about 20 mm., the dispersion being under nonturbulent flow conditions, the tower having a continuous stream of water flowing countercurrent to the introduction of the high pour point fraction and the water entering the tower is at least 5°F. below the average congelation temperature of the high pour point fraction,
   3. permitting the dispersed particles to remain in contact with the water for sufficient time to at least substantially congeal the particles,
   4. passing the congealed particles upward through the tower and through an interface within the upper portion of the tower, the interface being the juncture of water within the tower and a liquid hydrocarbon introduced into the tower at a position above the interface, the liquid hydrocarbon comprised of the relatively low pour point fraction, and
   5. withdrawing at least a portion of the resulting slurry of the congealed particles in the liquid hydrocarbon and transporting the slurry in a conduit at a temperature below about the solution temperature of the congealed particles in the liquid hydrocarbon.

16. The process of claim 15 wherein the average diameter of the congealed particles is about 0.1 to about 10 mm.

17. The process of claim 15 wherein the pour point of the "waxy" crude oil is about 0° to about 150°F.

18. The process of claim 15 wherein the relatively high pour point fraction is equivalent to about 20% to about 70% by weight of the crude oil.

19. The process of claim 15 wherein a portion of the crude oil is cracked during fractionation.

20. The process of claim 15 wherein fractionation is effected by distillation.

21. The process of claim 15 wherein an oleophilic surfactant is admixed with the high pour point fraction before it is congealed.

22. The process of claim 21 wherein about 0.001 to about 20% by volume, based on the high pour point fraction, of surfactant is admixed.

23. The process of claim 15 wherein a gas miscible wit the low pour point fraction is admixed with the slurry either before or during transportation of the slurry.

24. The process of claim 15 wherein a crude oil soluble in the liquid hydrocarbon is admixed with the slurry either before or during transportation of the slurry.

25. The process of claim 15 wherein the congealed particle is substantially coated with a solid material.

26. The process of claim 15 wherein the average diameter of the congealed particles is about 0.5 to about 5 mm.

27. The process of claim 15 wherein the concentration of congealed fraction in the slurry is about 1% to about 80% by weight.

28. The process of claim 15 wherein the concentration of congealed fraction in the slurry is about 10% to about 50% by weight.

29. The process of claim 15 wherein the congealed particle is substantially spherical.

30. The process of claim 15 wherein the high pour point fraction is dispersed through nozzles into the bottom of the tower.

31. The process of claim 15 wherein the high pour point fraction is at a temperature of about 30° to about 180°F. above the average congelation temperature of the high pour point fraction.

* * * * *